(12) United States Patent
Eswaran

(10) Patent No.: US 8,670,320 B2
(45) Date of Patent: Mar. 11, 2014

(54) QUALITY OF SERVICE ROUTING ARCHITECTURE

(75) Inventor: Anand Eswaran, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 686 days.

(21) Appl. No.: 12/703,164

(22) Filed: Feb. 9, 2010

(65) Prior Publication Data

US 2010/0202312 A1 Aug. 12, 2010

(30) Foreign Application Priority Data

Feb. 9, 2009 (IN) .............................. 275/CHE/2009

(51) Int. Cl.
*H04L 1/00* (2006.01)
(52) U.S. Cl.
USPC .......................... 370/235; 370/230; 370/401
(58) Field of Classification Search
USPC ............ 370/235, 254, 398, 237, 238, 395.21, 370/395.31, 395.51, 395.52; 709/223, 224, 709/225, 226, 232, 250; 455/406, 452.2
See application file for complete search history.

(56) References Cited

U.S. PATENT DOCUMENTS

| | | | | |
|---|---|---|---|---|
| 5,828,844 A * | 10/1998 | Civanlar et al. | ............... | 709/228 |
| 6,587,457 B1 * | 7/2003 | Mikkonen | .................... | 370/356 |
| 6,714,547 B1 * | 3/2004 | Fujita | ....................... | 370/395.52 |
| 6,760,775 B1 * | 7/2004 | Anerousis et al. | ............ | 709/238 |
| 2008/0025218 A1 * | 1/2008 | Liu | ................................ | 370/235 |

OTHER PUBLICATIONS

Katerina Argyraki, et al., "Active Internet Traffic Filtering: Real-Time Response to Denial-of-Service Attacks", Distributed Systems Group, Stanford University.
Ratul Mahajan, et al., "Controlling High Bandwidth Aggregates in the Network?", ICSI Center for Internet Research (ICIR), AT&T Labs Research.
E. Chen, et al., "Address Prefix Based Outbound Route Filter for BGP-4 draft-ietf-idr-bgp-prefix-orf-04.txt" http://web.archive.org/web/20071201...archive.org/.../draft-ietf-idr-bgp-pref..., Jan. 21, 2009, pp. 1-7.
Jamie Twycross, et al., "Implementing and testing a virus throttle", Hewlett-Packard Company, Proceedings 12th USENIX Security Symposium, Aug. 4-8, 2003, Washington, DC, USA.
Sumeet Singh, et al., "Automated Worm Fingerprinting", Department of Computer Science and Engineering, University of California, San Diego.

* cited by examiner

*Primary Examiner* — Dady Chery

(57) ABSTRACT

A quality of service routing architecture is provided which includes a network router configured to route network data traffic. The architecture may further include a routing communication protocol for to sending router control information from the network router to other network routers, the routing communication protocol having a quality of service level attribute. There may be a routing communication protocol decoding module on the network router. The routing communication protocol decoding module may identify incoming routing control communications and determine the quality of service level attribute of the incoming routing control communications. The network router can also include a quality of service forwarding module for determining a next hop router value based on the quality of service level attribute and forwarding data according to the next hop value determination.

18 Claims, 3 Drawing Sheets

QUALITY OF SERVICE ROUTING ARCHITECTURE

This application claims priority to Indian patent application Number 275/CHE/2009 filed Feb. 9, 2009, which is incorporated by reference in its entirety for all purposes.

BACKGROUND

Many computer applications and programs provide the capability to generate, transport, and present information in textual, graphic, aural and visual formats. In many applications, information is generated or stored at devices that are remote from the using devices and human users. In such situations, a communications network provides the transport mechanisms to users in a timely and efficient manner. Particularly with multimedia information, such as audio and full motion video, there are unique properties that impose certain burdens on the communications network. Unexpected network delays caused by throughput or processing delays can disrupt the presentation of the multimedia data to the end user. Some applications require certain rates of throughput or processing and network delays can be troublesome. Other delay sensitive applications include client/server playback of stored multimedia data streams (e.g., library distribution), client/client video conferencing, and client/client collaborative work.

DETAILED DESCRIPTION OF EXAMPLE EMBODIMENT(S)

Figure 1:
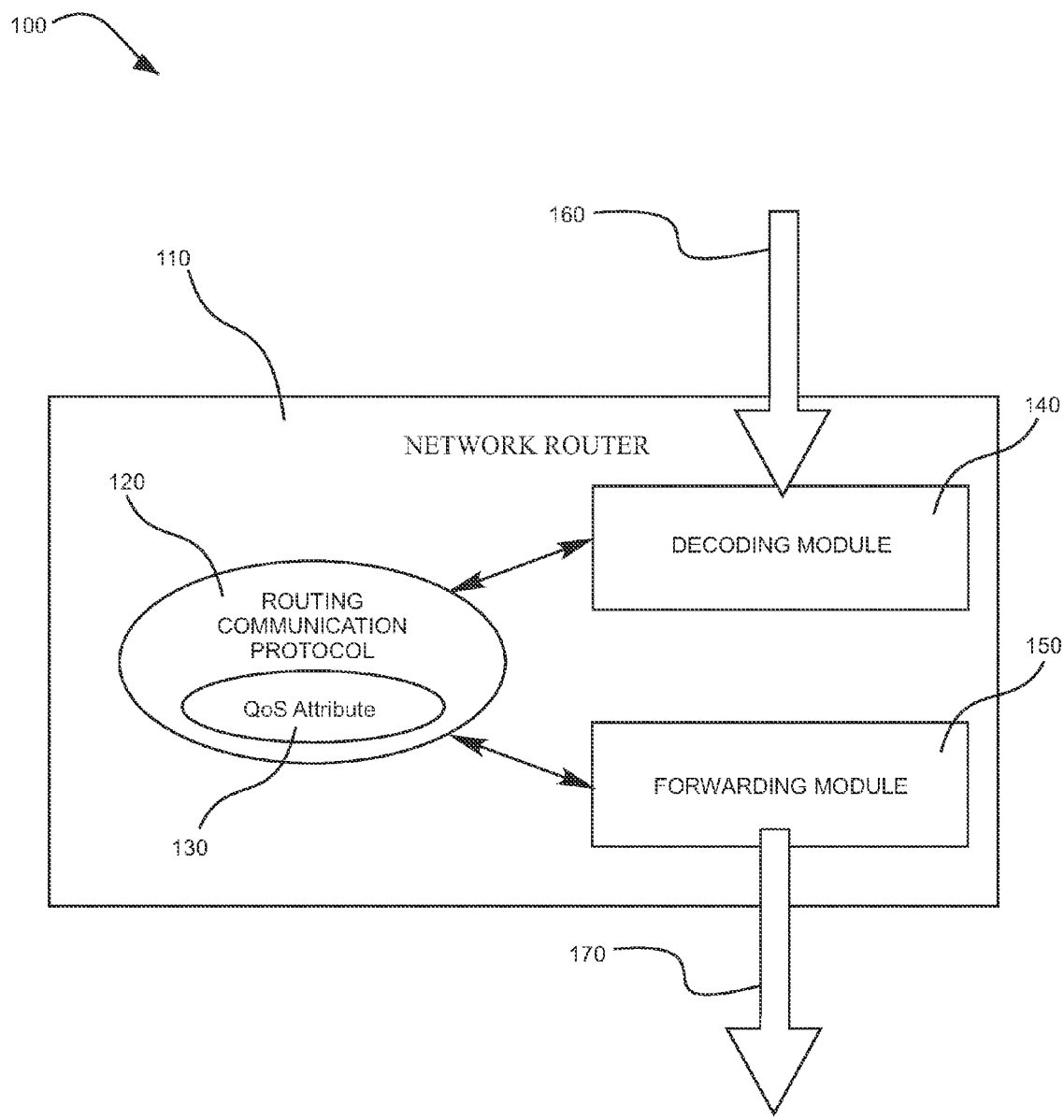
FIG. 1 is an illustration of a system for quality of service routing, in accordance with an embodiment of the present invention.

Additional features and advantages of the invention will be apparent from the detailed description which follows, taken in conjunction with the accompanying drawings, which together illustrate, by way of example, features of the invention. Reference will now be made to the exemplary embodiments illustrated, and specific language will be used herein to describe the same. It will nevertheless be understood that no limitation of the scope of the invention is thereby intended.

Quality of service (QoS) routing is a mechanism to achieve end-to-end QoS across the internet by allowing high-priority applications or packets to take high-quality routing paths in the internet, thus providing better service for the high-priority applications. The internet infrastructure is currently based on a best-effort service architecture. The playback of full-screen, high-quality, stored video and audio at the standard rate of thirty video frames per second; even when compressed, may require approximately a megabit per second of bandwidth. Four megabits per second or more may be required to support two-way video (interactive or conferencing) of high quality.

Emerging high bandwidth technologies and architectures have attempted to incorporate techniques to accomplish quality of service management. These techniques may involve the provision of a sophisticated user network interface through which the user requests a connection for multimedia transport and specifies the quality of service that is desired. Within the network itself, sophisticated algorithms may be provided to examine the status of resources, compute a route that best satisfies the request, reserve those resources, and notify the user that the connection has been reserved. These algorithms can be expensive to implement and may be among the most technically demanding functions within the network. They may require the network to understand the capacity and delay characteristics of each communications link in the network in order to determine whether the quality of service request can be granted. In addition, they require the network to establish, maintain, and update the global network topology information database in order to determine the optimal route for a connection. Furthermore, attempts at quality of service management on networks have been largely directed towards local area network (LAN) communications on an intranet and do not address management of quality of service levels between intranets, between an intranet and the internet, or between internet networks. In fact, while QoS routing has been a popular topic for the last decade, the focus of prior approaches has been primarily on IGP (Interior Gateway Protocol) QoS algorithms which provide QoS routing inside a particular administration domain.

While an increasing number of applications with end-to-end QoS requirements are emerging in the internet, there is virtually no support for inter-domain QoS routing. QoS routing is challenging in a decentralized Internet where administrative authority is shared among multiple autonomous systems. The present system and method provides an internet protocol or extensions to a standard inter-domain routing protocol used in the internet, such as Border Gateway Protocol (BGP), to achieve internet-wide QoS routing by allowing domains to independently decide how to route flows that match a particular QoS-level, assuming that QoS-level of each flow is determined at the network edge. The system and method can be easily adoptable where most internet based systems already use BGP.

The system and method can differentially control the paths packets will take into a domain and paths packets will take out of a domain for QoS purposes using an internet router communication protocol, such as BGP or others, while other efforts are instead directed at propagating QoS policy across a domain.

While the present system and method may use a network routing protocol, it is recognized that the system and method may alternatively use an extension to an existing inter-domain network protocol to allow easy integration into networks already supporting a particular protocol. As BGP may be considered the current dominant inter-domain protocol used by most internet routers, the discussion herein will be directly largely towards use of an extension of BGP. However, the invention may work with other inter-domain routing protocols as well.

Routing protocols can be used to exchange routing information between network routers. A router is a networking device whose software and hardware are usually tailored to the tasks of routing and forwarding packets of information. For example, on the internet, information is directed to various paths by routers. Routers operate in two different planes. There is a control plane, in which the router learns the outgoing interface that is most appropriate for forwarding specific packets to specific destinations. There is also a data forwarding plane, or simply "data plane", which is responsible for the actual process of sending a packet received on a logical interface to an outbound logical interface.

In accordance with one aspect of the present invention, the data plane comprises a Differentiated Services (Diff-Serv)

data packet classification scheme that "colors" packets according to priority of the application originating the packet. The control plane may comprise an inter-domain routing protocol, such as Multi-Protocol Border Gateway Protocol (MP-BGP) that can exchange routing information regarding multiple address-families over the same protocol. The network router can be configured with multi-forwarding tables (VRF instances) to decide which of the routing tables to do an IP look-up on based on both the input interface as well as content identifiers in the packet. VRF (Virtual Private Network (VPN) Routing and Forwarding) is a technology used in computer networks that allows multiple instances of a routing table to co-exist within the same router at the same time. Because the routing instances are independent, the same or overlapping IP addresses can be used simultaneously without conflicting with each other. Using the Diff-serv, MP-BGP and VRF schemes together, an inter-domain quality of service routing architecture may be created. Not only can this architecture be used to implement QoS routing in the public Internet, but it can also be used for QoS routing in VPN address families as well.

A border router within a domain may receive a packet from another domain and need to choose a next-hop or another router to which to send the packet. This next-hop may be a router inside the same domain to which the border router belongs. The border router may be a VRF compatible router and have one forwarding table per Diff-Sery code-point level. If the incoming packet matches a particular Diff-Sery code-point, a corresponding route-table will be used for an internet protocol (IP) destination look-up. Similarly, a router in a VPN can determine if an incoming packet matches a particular Diff-Sery code-point, and use a corresponding route-table for a destination look-up. However, in a VPN setting, the VPN is associated with a particular VRF instance, which in turn is associated with one or more input interfaces. In order to support VPN QoS, an input interface is used along with the Diff-Sery code-point in order to identify the routing table on which the IP lookup is to be done.

In accordance with one embodiment, the data plane of the present invention may operate in the following manner. With the classical Diff-Sery model, classification engines at the edge of the network classify packets and assign them a priority. This priority can then be assigned as a Diff-Sery code-point and embedded in the packet in the IP header. Routers with multi-forwarding capability can then use both the input interface and the Diff-Sery code-point field in the IP packet as a key to retrieve the index of one of the multi-forwarding routing tables. (Routers with multiple VRF instances may typically be located at domain boundaries). The destination IP look-up can be accomplished using the routing table corresponding to the index field.

Optionally, a QoS level may be associated with a color coding system, such as: gold for high quality service paths, silver for medium quality service paths, and bronze for low quality service paths. Different routing tables have different next-hops associated with a QoS level of the packet. For example, voice over internet protocol (VOIP) flows inside a domain may have gold-class paths and hence the routing-table corresponding to VoIP may have a gold-class router as its next-hop gateway while file transfer protocol (FTP) flows for the same destination may have a bronze-class router as the next-hop gateway. Generally, the choice of the next-hop may be considered an intra-domain concern. Thus, in a domain, the choice of which QoS-level takes which path may be left completely to the intra-domain routing protocols. In one aspect, standard schemes such as RFC 3630 can be used for intra-domain routing. It also may be noted that the VRF instance which the packet came in on can be mapped statically (by administrator configuration) to some well-defined QoS level and hence the look-up can proceed by consulting that QoS-level's routing table, thus over-riding any information available in the packet. This can allow an administrator's policy to override any information (such as the ToS-field in IPv4) available in the packet.

In accordance with one embodiment of the present invention involving inter-domain routing, the control plane may operate in the following manner. The control plane can be responsible for transitively propagating QoS-specific network layer reachability information (NLRI) across the Internet. Extensions to MP-BGP may be implemented to support the same. In particular, each BGP route can be associated with a new QoS level attribute in addition to existing route attributes, such as: origin, Multi-Exit-Discriminator (MED), next-hop, etc. The QoS level attribute may be an optional attribute. MP-BGP currently can support one routing table per address family. Multiple address families are supported by MP-BGP. MP-BGP can support global unicast and multicast for IPv4 and Ipv6, and also VPN routes (where each route is associated with a (VPN identifier, RouteDistinguisher) tuple) and is therefore a useful protocol for use with this invention. By adding a QoS-level attribute to BGP, MP-BGP may support one routing table instance per QoS-level per address family. When BGP route information is propagated, the QoS attribute may be propagated in a BGP packet as well. Accordingly, existing BGP best-paths selection algorithms can be installed into the routing table corresponding to that QoS-level and address family for running per QoS-level per address family calculations. As route reachability information per address-family per QoS-level can be propagated across the internet, end-to-end QoS differentiation across inter-domain networks in the internet can be accomplished. As MP-BGP is VPN-aware, the invention may also be extended to provide VPN QoS.

As shown in FIG. 1, the system may comprise an architecture 100 for quality of service routing, having a network router 110 configured to route network data traffic. The system can include a routing communication protocol 120, configured to send router control information from the network router to other intra-domain or inter-domain network routers. The routing communication protocol can include a quality of service attribute 130. Incoming data packets, or routing control communications 160, may have a quality of service level indicated in a QoS attribute field. A routing communication protocol decoding module 140 can be included on the network router to determine the quality of service of the incoming routing control communications. The decoding module may consult with routing tables and routing rules for the routing communication protocol as described. A quality of service forwarding module 150, also on the network router, can then determine a next hop router value based on the quality of service level attribute and forward data and routing control communications 170 according to the next hop value determination.

Figure 2:
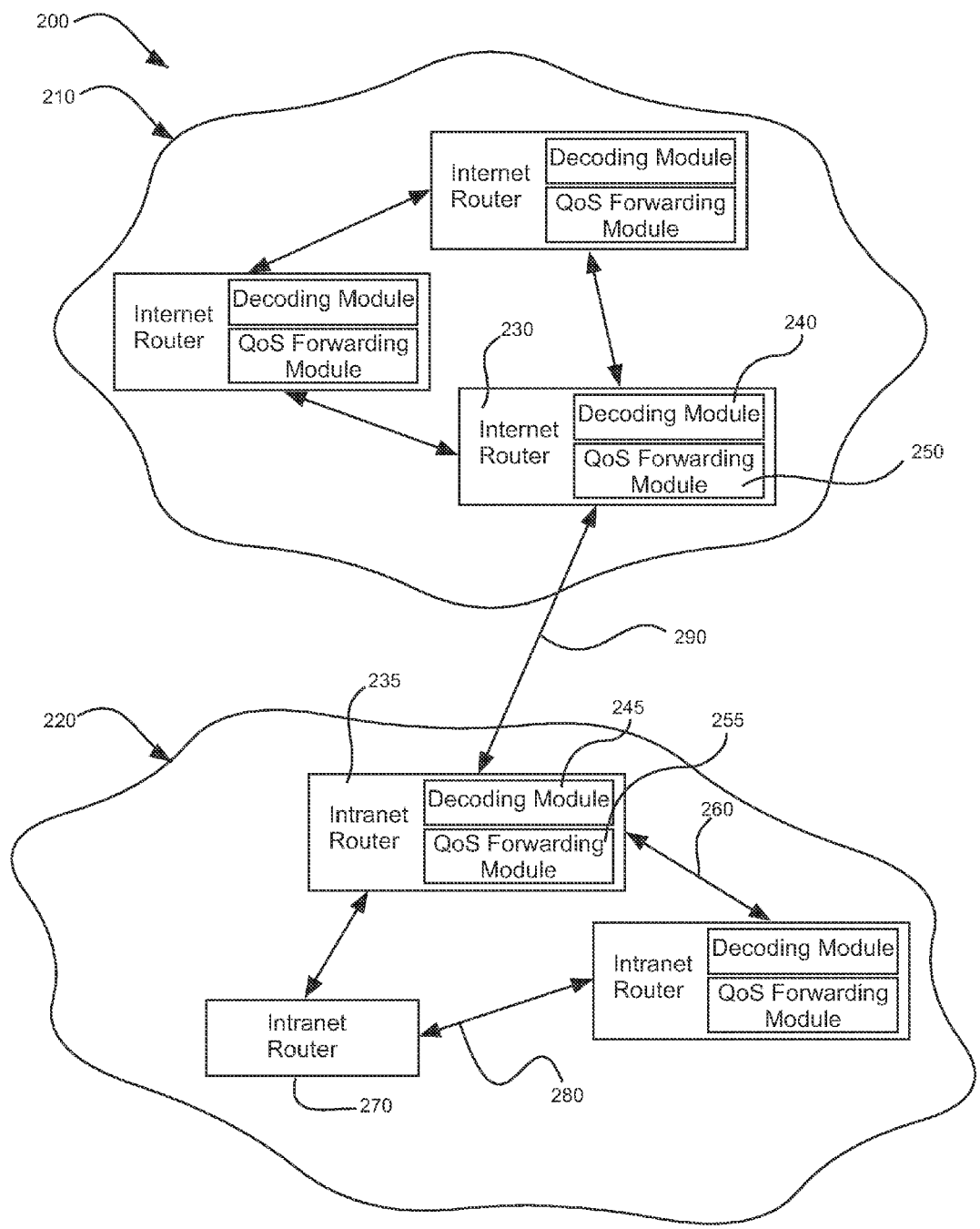
FIG. 2 is an illustration of a system for quality of service routing, in accordance with an embodiment of the present invention.

In accordance with one embodiment of the present invention, and as shown in FIG. 2, there may be a quality of service system or architecture 200 having an internet router 230 in an internet network 210, and an intranet router 235 on an intranet network 220. These routers are configured to route network data traffic. As has been described above, the system can include a routing communication protocol, configured to be sent 290 between the internet and intranet routers. Also, the routing communication protocol can likewise have a quality of service level attribute. The internet router and intranet router can both have decoding and QoS forwarding modules 240, 250 and 245, 255 respectively, which operate as described above regarding FIG. 1.

It is noted here that where the intranet 220 is a VPN, the routing control communication 260 can also include input from an input interface. It is also noted here that communications 280 can be sent between routers implementing the BGP protocol extension and routers 270 without the enhancement. Where a router 270 does not have the enhancements of the present invention, data flows will be processed as normal and the QoS level attribute can be treated as non-existent. Furthermore, communications 280 from such a router will likewise not have a QoS level designated. As described above, the QoS level attribute can be optionally designated, so enhanced routers will not have difficulty when receiving data flows from non-enhanced routers.

Figure 3:
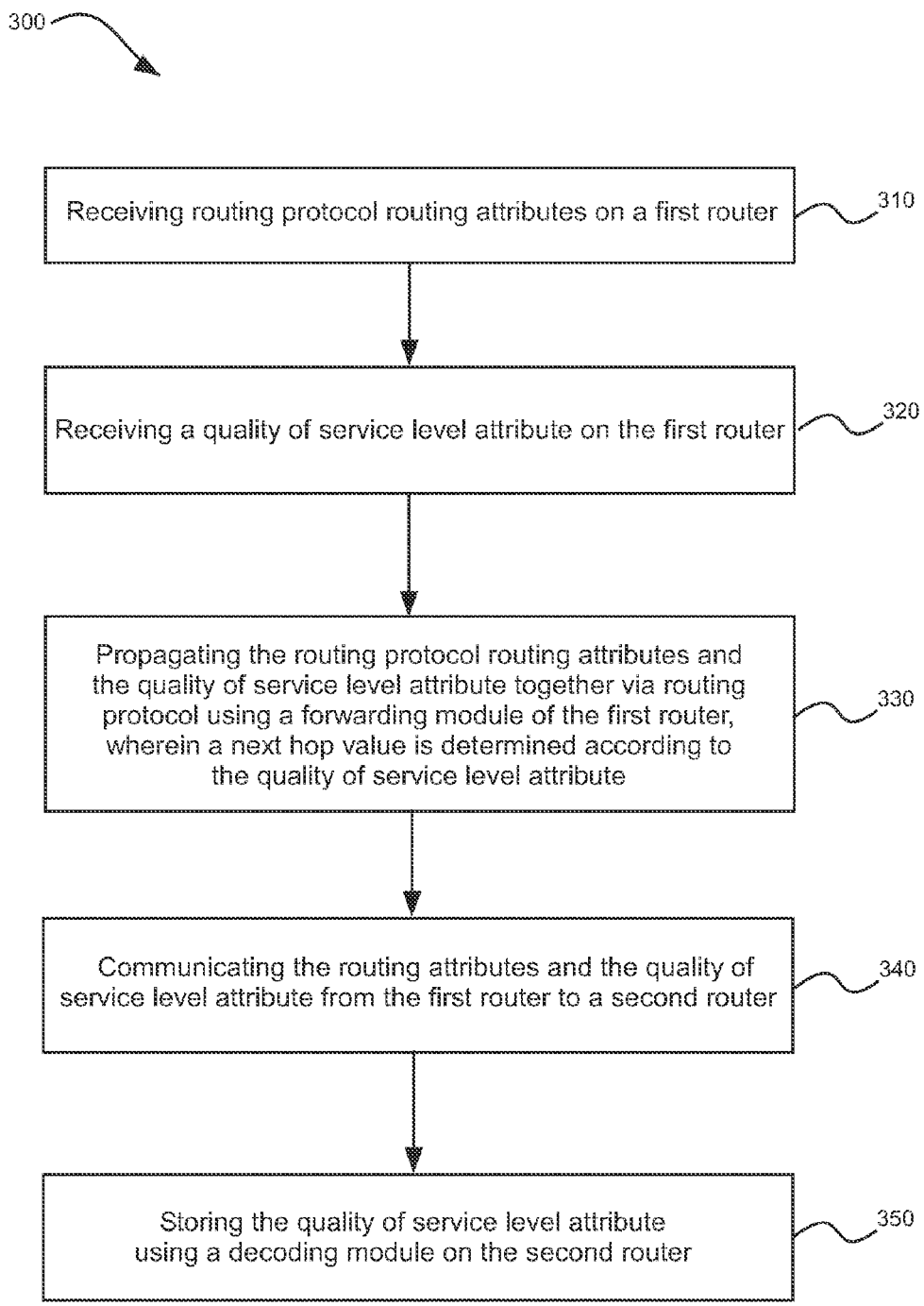
FIG. 3 is a flow diagram of a method of quality of service routing, in accordance with an embodiment of the present invention.

In accordance with one embodiment, and as depicted in FIG. 3, the present invention provides a method for quality of service routing. As in block 310, the method can include: receiving routing protocol routing attributes on a first router. As in block 320, a quality of service level attribute can be received on the first router. As in block 330, a forwarding module of the first router can be used to propagate the routing protocol routing attributes and the quality of service level attribute together via routing protocol, where a next hop value is determined according to the quality of service level attribute. The routing attributes and the quality of service level attribute can be communicated from the first router to a second router, as in block 340. The quality of service level attribute can be stored using a decoding module on the second router, as in block 350. The method may further comprise receiving input from an input interface associated with the first router for quality of service routing in a virtual private network, wherein the input and the quality of service level attribute are both evaluated to determine the next hop value. In accordance with the method, the first internet router may be configured to route data to different address families. Further in accordance with the method, the quality of service level attribute may allow a plurality of quality of service levels. In further accordance with the method, the first internet router may comprise a plurality of instances of routing tables, comprising one routing table instance per quality of service level per address family.

The present invention can provide several advantages over the prior art. The system provides QoS routing in an internet context. The system can be easily implemented despite the internet not being a centralized cooperating entity but rather one made of multiple administrative domains, each having their own administrative policies, because of already prevalent use of a common routing protocol (e.g., BGP).

The system can operate as an extension of existing internet protocol, such as BGP, which is a dominant inter-domain routing protocol today. Furthermore, a majority of internet service provider (ISP) border routers on the internet, already support VRF capabilities, further increasing the ease of implementation of the quality of service architecture presented herein.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A network router to implement quality of service routing, comprising:
a processor; and
a memory on which is stored machine-readable instructions that when executed, cause the processor to:
determine a quality of service level attribute of incoming routing control communications;
determine a particular quality of service routing table of a plurality of quality of service routing tables based on the determined quality of service level attribute, wherein each of the plurality of quality of service routing tables is associated with a respective quality of service level attribute of a plurality of quality of service level attributes;
determine, based on a destination IP lookup using the determined particular quality of service routing table, a next hop router value; and
forward data according to the next hop value determination.

2. The network router in accordance with claim 1, wherein the machine-readable instructions are further to forward the determined quality of service level attribute of the incoming routing control communications to an internet router or an intranet router.

3. The network router in accordance with claim 1, further comprising a multi-forwarding routing table.

4. The network router in accordance with claim 1, wherein the machine-readable instructions are further to provide quality of service routing in a virtual private network.

5. The network router in accordance with claim 4, wherein the machine-readable instructions are further to provide quality of service routing in the virtual private network through a determination of the particular quality of service routing table to use based on contents of the determined quality of service level attribute and an input interface.

6. The network router in accordance with claim 1, wherein the processor is to implement an extension of Border Gateway Protocol (BGP), and is to allow a domain to independently route data flows that match a quality of service level of each data flow determined at an edge of the domain.

7. The network router in accordance with claim 1, wherein, to forward the data, the machine readable instructions are to cause the processor to forward an IP packet comprising a header portion and a data portion, wherein the quality of service level attribute is imbedded in the header portion of the IP packet.

8. A network routing device, comprising:
a processor; and
a memory on which is stored machine-readable instructions that when executed, cause the processor to implement:
a routing communication protocol to be used to exchange routing information between internet and intranet routers, the routing communication protocol supporting a plurality of quality of service level attributes that are associated with a respective quality of service level;
a routing communication protocol decoding module to identify incoming routing communications and determine a quality of service level attribute of the incoming routing communications;
a plurality of quality of service routing tables that are associated with a respective quality of service level attribute of a plurality of quality of service level attributes; and a quality of service forwarding module to:
  determine a particular quality of service routing table of the plurality of quality of service routing tables based on the determined quality of service level attribute of the incoming routing communications; and
  determine, based on a destination IP look-up using the determined particular quality of service routing table, a next hop router value; and
  forward data according to the next hop value determination.

9. The network routing device in accordance with claim 8, wherein the network router supports multiple address families, and the network routing device further comprises:
  one routing table per quality of service level per address family.

10. The network routing device in accordance with claim 8, wherein the network routing device comprises a multi-forwarding routing table.

11. The network routing device in accordance with claim 8, wherein the network routing device is to provide quality of service routing in a virtual private network.

12. The network routing device in accordance with claim 11, wherein to provide quality of service routing in the virtual private network, the network routing device is to determine the particular quality of service routing table to use based on contents of the routing communication protocol and an input interface.

13. The network routing device in accordance with claim 8, wherein an administrative domain policy is to override attributes in the routing communication protocol.

14. The network routing device in accordance with claim 8, wherein, to forward the data, the machine readable instructions are to cause the processor to forward an IP packet comprising a header portion and a data portion, wherein the quality of service level attribute is imbedded in the header portion of the IP packet.

15. A method for quality of service routing, comprising:
  receiving, via a routing protocol, routing protocol routing attributes on a first router;
  receiving a quality of service level attribute on the first router;
  propagating the routing protocol routing attributes and the quality of service level attribute together to a second router in an IP packet via the routing protocol using a forwarding module of the first router, wherein a next hop value is determined according to a destination IP look-up in a routing table corresponding to the quality of service level attribute;
wherein:
  the first router is to route data to different address families;
  the quality of service level attribute is to allow a plurality of quality of service levels; and
  the first router comprises a plurality of routing tables, wherein the plurality of routing tables includes one routing table per quality of service level per address family.

16. The method in accordance with claim 15, further comprising receiving input from an input interface associated with the first router for quality of service routing in a virtual private network, wherein the input and the quality of service level attribute are both evaluated to determine the next hop value.

17. The network routing device in accordance with claim 8, wherein the routing communication protocol is an extension of Border Gateway Protocol (BGP), and is to allow a domain to independently route data flows that match a quality of Service level of each data flow determined at an edge of the domain.

18. The method according to claim 15, wherein the routing protocol is an extension of Border Gateway Protocol (BGP), and propagating the routing protocol routing attributes and the quality of service level attribute comprises allowing a domain to independently route data flows that match a quality of service level of each data flow determined at an edge of the domain.

* * * * *